US008270635B2

(12) United States Patent
Wu et al.

(10) Patent No.: US 8,270,635 B2
(45) Date of Patent: Sep. 18, 2012

(54) MICROPHONE CIRCUIT AND METHOD FOR PREVENTING MICROPHONE CIRCUIT FROM GENERATING NOISE WHEN RESET

(75) Inventors: Li-Te Wu, Taipei (TW); Cheng-Feng Shih, Taoyuan County (TW)

(73) Assignee: Fortemedia, Inc., Sunnyvale, CA (US)

( * ) Notice: Subject to any disclaimer, the term of this patent is extended or adjusted under 35 U.S.C. 154(b) by 545 days.

(21) Appl. No.: 12/510,457

(22) Filed: Jul. 28, 2009

(65) Prior Publication Data

US 2011/0026731 A1 Feb. 3, 2011

(51) Int. Cl.
*H04B 15/00* (2006.01)

(52) U.S. Cl. ...................... 381/94.5; 381/94.6; 381/94.8

(58) Field of Classification Search .................. 341/144, 341/118, 143; 381/28, 94.1, 94.4, 94.5, 94.8, 381/120, 121, 111–115, 123; 327/309, 321, 327/322, 538
See application file for complete search history.

(56) References Cited

U.S. PATENT DOCUMENTS

| | | | | |
|---|---|---|---|---|
| 2007/0030038 | A1 * | 2/2007 | McHugh et al. | 327/100 |
| 2009/0003629 | A1 * | 1/2009 | Shajaan et al. | 381/113 |
| 2009/0257601 | A1 * | 10/2009 | Motsenbocker | 381/71.11 |
| 2009/0316935 | A1 * | 12/2009 | Furst et al. | 381/111 |
| 2011/0029109 | A1 * | 2/2011 | Thomsen et al. | 700/94 |

* cited by examiner

*Primary Examiner* — Fan Tsang
*Assistant Examiner* — Eugene Zhao
(74) *Attorney, Agent, or Firm* — Thomas|Kayden

(57) ABSTRACT

The invention provides a microphone circuit. In one embodiment, the microphone circuit comprises a transducer, a biasing resistor, a pre-amplifier, and a switch circuit. The transducer is coupled between a ground and a first node for converting a sound into a voltage signal output to the first node. The biasing resistor is coupled between the ground and the first node. The pre-amplifier is biased with a biasing voltage and coupled between the first node and a second node, and amplifies the voltage signal to obtain an output signal at the second node. The switch circuit is coupled between the first node and the ground, couples the first node to the ground when the microphone circuit is reset, and decouples the first node from the ground after a voltage status of the microphone circuit is stable, thus clamping a voltage of the first node to the ground to prevent generation of a popping noise when the microphone circuit is reset.

20 Claims, 6 Drawing Sheets

MICROPHONE CIRCUIT AND METHOD FOR PREVENTING MICROPHONE CIRCUIT FROM GENERATING NOISE WHEN RESET

BACKGROUND OF THE INVENTION

1. Field of the Invention

The invention relates to microphone circuits, and more particularly to eliminating a popping noise for microphone circuits.

2. Description of the Related Art

A microphone transducer, such as an electret condenser microphone (ECM), converts a sound to a voltage signal. A microphone transducer, however, has weak driving ability and cannot effectively pass the voltage signal to a subsequent circuit with a higher impedance. The microphone transducer therefore requires a pre-amplifier circuit, which has a greater driving ability to pass the voltage signal generated by the microphone transducer to the subsequent circuit.

Referring to FIG. 1, a block diagram of a conventional microphone circuit 100 is shown. The microphone circuit 100 comprises a transducer 102, a biasing resistor 104, and a pre-amplifier 106. After the transducer 102 generates a voltage signal at a node 120, the preamplifier 106 amplifies the voltage signal with a unit gain to generate an output signal $V_o$ at a node 122. The transducer 102 and the biasing resistor 104 are coupled between the node 120 and a ground $V_{GND}$. The biasing resistor 104 maintains a stable offset voltage at the node 120. In one embodiment, the biasing resistor 104 has a resistance ranging between 100 MΩ and 100 GΩ.

The pre-amplifier 106 requires external power supply for amplification of the output voltage. When the microphone circuit 100 is reset, a biasing voltage is applied to the pre-amplifier 106, temporarily increasing the voltage at the node 120 and resulting in a popping noise. Referring to FIG. 2, a circuit diagram of a conventional microphone circuit 200 is shown. The pre-amplifier 106 of the microphone circuit 100 is modeled as a pre-amplifier 206 comprising a loading resistor 244, an N-type JFET transistor 242, and a capacitor 246. The transducer 102 of the microphone circuit 100 is modeled as a transducer 202 comprising a signal source 232 and a capacitor 234. The biasing resistor 204 is equivalent to the biasing resistor 104.

The capacitor 246 indicates a parasitic capacitance between a gate and a drain of the JFET transistor 242 and ranges between 200 fF and 1 pF. The capacitor 234 of the transducer 202 has a capacitance ranging between 5 pF and 10 pF. When the microphone circuit 200 is reset, a biasing voltage $V_{DD}$ of 2V is applied to a terminal of the loading resistor 244, resulting in a voltage of 1.67V at the node 222 and inducing temporary voltage increase ΔV of about 64 mV at the node 220 according to following algorithm:

$$\Delta V = 1.67\text{V} \times [C_{246}/(C_{246}+C_{234})] = 1.67\text{V} \times [200\text{ fF}/(200\text{ fF}+5\text{ pF})] = 0.64\text{ mV},$$

wherein $C_{246}$ is capacitance of the capacitor 246, and $C_{234}$ is capacitance of the capacitor 234.

Referring to FIG. 3, a schematic diagram of the voltage at the node 220 of FIG. 2 during resetting is shown. When the biasing voltage $V_{DD}$ of 2V is applied to the loading resistor 244 of the pre-amplifier 244 at time T0, the voltage at the node 220 is raised to 64 mV at time T1 and then gradually reduced to a converge voltage of 0V. A converge time $T_C$ of 400 ms is calculated according the following algorithm:

$$T_C = R_{204} \times (C_{246}+C_{234}) \times 8 = 400\text{ ms},$$

wherein $R_{204}$ is resistance of the biasing resistor 204, $C_{246}$ is capacitance of the capacitor 246, and $C_{234}$ is capacitance of the capacitor 234.

A typical ECM microphone with a diameter 4 mm has a sensitivity of −44 dB Vrms/Pa, wherein Pa is a unit of air pressure and 1 Pa is equal to a 94 dB sound pressure level. The temporary voltage increase ΔV of 64 mV at the node 220 therefore generates a popping noise equal to a 105 dB sound pressure level. In comparison with conversation of a 60 dB sound pressure level and rock-and-roll music of a 94 dB sound pressure level, the popping noise induced by resetting the microphone circuit 200 has a much greater sound pressure level of 105 dB and requires a long converge period of 400 ms before being settled. The popping noise therefore grades performance of the microphone circuit 200. Thus, a method for preventing a microphone circuit from generating a popping noise when being reset is therefore required.

BRIEF SUMMARY OF THE INVENTION

The invention provides a microphone circuit. In one embodiment, the microphone circuit comprises a transducer, a biasing resistor, a pre-amplifier, and a switch circuit. The transducer is coupled between a ground and a first node for converting a sound into a voltage signal output to the first node. The biasing resistor is coupled between the ground and the first node. The pre-amplifier is biased with a biasing voltage and coupled between the first node and a second node, and amplifies the voltage signal to obtain an output signal at the second node. The switch circuit is coupled between the first node and the ground, couples the first node to the ground when the microphone circuit is reset, and decouples the first node from the ground after a voltage status of the microphone circuit is stable, thus clamping a voltage of the first node to the ground to prevent generation of a popping noise when the microphone circuit is reset.

The invention provides a method for preventing a microphone circuit from generating a popping noise during resetting. First, a switch circuit is coupled between a first node and a ground, wherein a transducer of the microphone circuit converts a sound into a voltage signal output to the first node, and a pre-amplifier of the microphone circuit amplifies the voltage signal at the first node to obtain an output signal. The switch circuit is then switched on to couple the first node to the ground during a resetting period in which a biasing voltage biasing the pre-amplifier is just applied to the pre-amplifier, thus preventing generation of a popping noise voltage at the first node during the resetting period. The switch circuit is switched off to decouple the first node from the ground in an ordinary period other than the resetting period.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
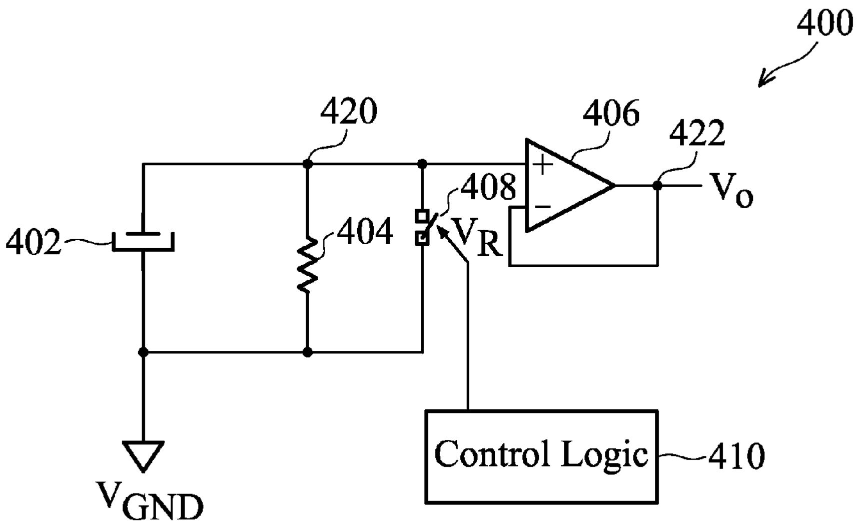
FIG. 4 is a block diagram of a microphone circuit according to the invention.

Referring to FIG. 4, a block diagram of a microphone circuit 400 according to the invention is shown. In one embodiment, the microphone circuit 400 comprises a transducer 402, a biasing resistor 404, a pre-amplifier 406, a switch circuit 408, and a control logic 410. The transducer 402 is coupled between a ground $V_{GND}$ and a node 420. The transducer 402 converts a sound into a voltage signal and outputs the voltage signal to the node 420. The biasing resistor 404 is coupled between the node 420 and the ground $V_{GND}$ and biases the node 420 with a DC voltage level of the ground voltage $V_{GND}$. The pre-amplifier 406 receives the voltage signal output by the transducer 402 at the node 420 and amplifies the voltage signal to obtain an output signal $V_o$ at a node 422. In one embodiment, the pre-amplifier 406 is a unity gain buffer.

Figure 1:
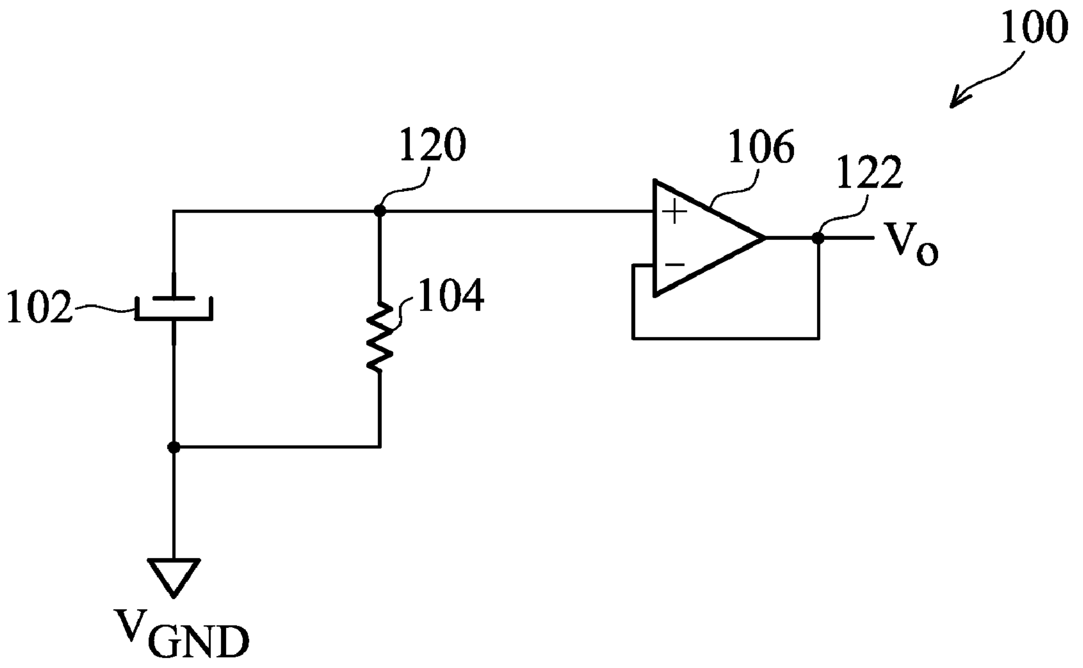
FIG. 1 ( PRIOR ART )
FIG. 1 is a block diagram of a conventional microphone circuit.
Figure 2:
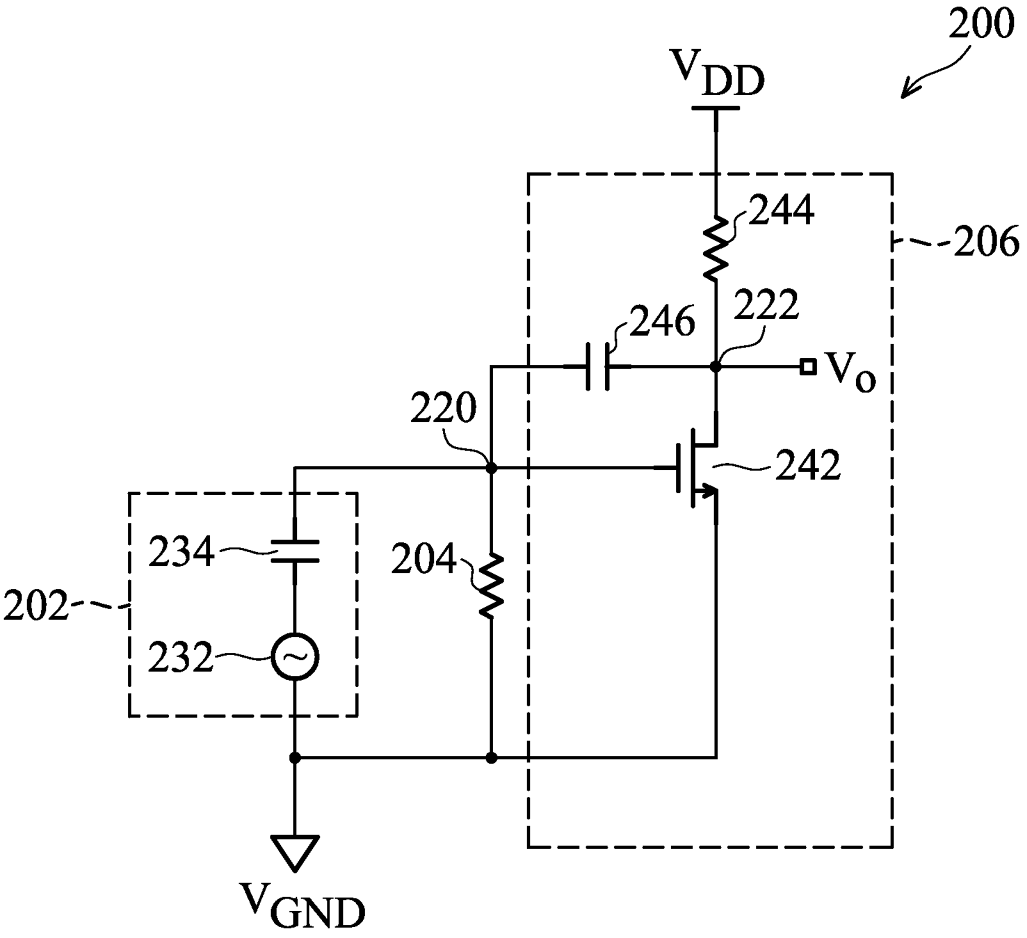
FIG. 2 ( PRIOR ART )
FIG. 2 is a circuit diagram of a conventional microphone circuit.
Figure 3:
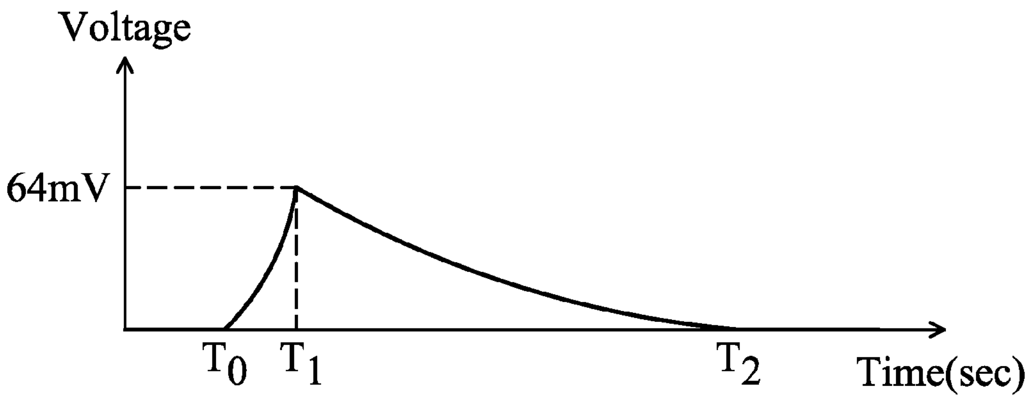
FIG. 3 ( PRIOR ART )
FIG. 3 is a schematic diagram of the voltage at a node 220 of FIG. 2 during resetting.

The pre-amplifier 406 requires power supplied by a biasing voltage for amplifying the voltage signal output by the transducer 402. The switch circuit 408 is coupled between the node 420 and the ground voltage $V_{GND}$. The switch circuit 408 therefore controls whether the voltage of the node 420 is set to the ground voltage $V_{GND}$. When the microphone circuit 400 is reset, the control logic 410 enables a resetting signal $V_R$ to switch on the switch circuit 408, and the node 420 is therefore directly coupled to the ground $V_{GND}$. As previously illustrated, when the microphone circuit 400 is reset, a biasing voltage $V_{DD}$ shown in FIG. 2 is applied to the pre-amplifier 406, and the voltage at the node 420 tends to have a temporary voltage increase as shown in FIG. 3. However, because the switch circuit 408 couples the node 420 the ground $_{VGND}$, the voltage of the node 420 is kept at the ground voltage $V_{GND}$ and prevented from increasing, thus avoiding generation of the popping noise during the reset period. After a voltage status of the pre-amplifier 206 is stable at time $T_1$ shown in FIG. 3, the control logic 410 switches off the switch circuit 408. The node 420 is therefore decoupled from the ground $V_{GND}$, allowing the voltage signal generated by the transducer 402 to be passed to the pre-amplifier 406. Thus, the switch circuit 408 clamps the voltage of the node 420 to the ground voltage during the reset period, in which the biasing voltage $V_{DD}$ is just applied to the pre-amplifier 406.

Figure 8A:
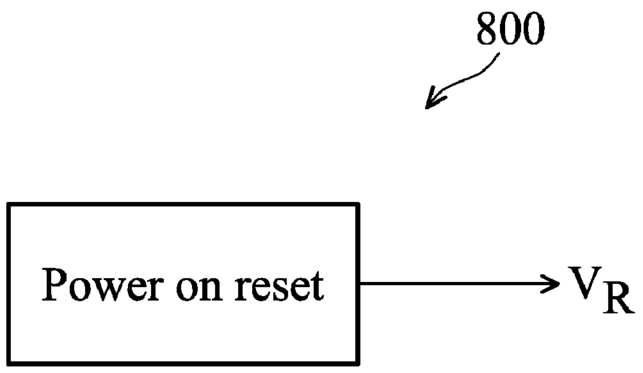
FIG. 8A is an embodiment of a control logic of FIG. 4.
Figure 8B:
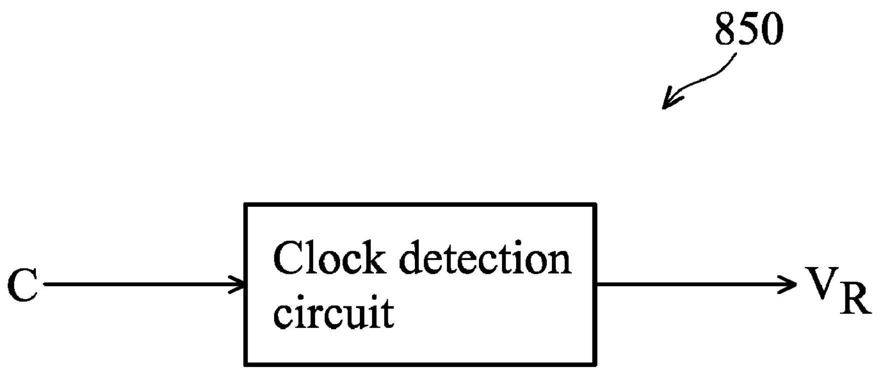
FIG. 8B is another embodiment of a control logic of FIG. 4.

Referring to FIG. 8A, an embodiment of a control logic 410 of FIG. 4 is shown. In the embodiment, the control logic 410 is a power-on-reset circuit 800. The power-on-reset circuit 800 detects the power level of a biasing voltage of the pre-amplifier 406. When the power level of the biasing voltage of the pre-amplifier 406 is lower than a threshold, the power-on-reset circuit 800 enables the resetting signal $V_R$ to switch on the switch circuit 408, thus coupling the node 420 to the ground $V_{GND}$ to avoid generation of a popping noise. Referring to FIG. 8B, another embodiment of a control logic 410 of FIG. 4 is shown. In the embodiment, the control logic 410 is a clock detection circuit 850. The clock detection circuit 850 detects a clock signal C frequency for operating the microphone circuit 400. When the frequency of the clock signal C is lower than a threshold, the clock detection circuit 850 enables the resetting signal $V_R$ to switch on the switch circuit 408, thus coupling the node 420 to the ground $V_{GND}$ to avoid generation of a popping noise.

Figure 5:
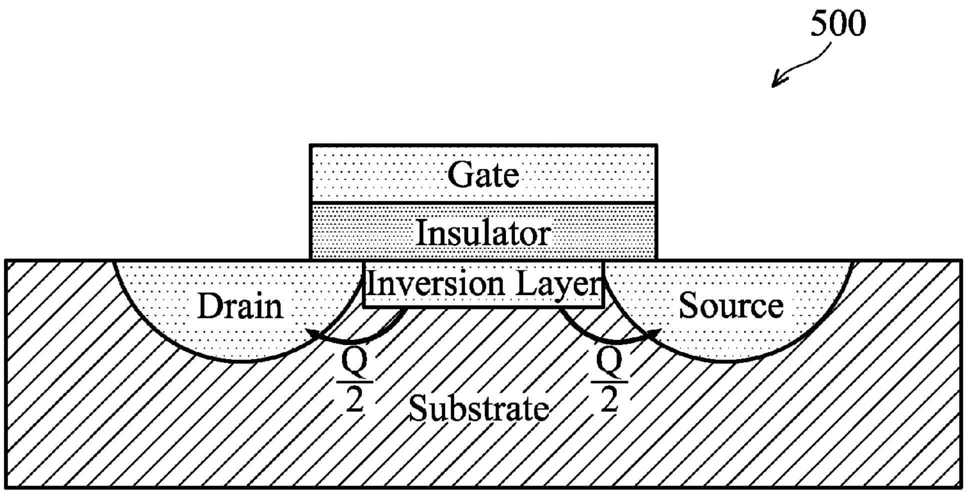
FIG. 5 is a cross-section view of an NMOS transistor.

In one embodiment, the switch circuit 408 is an NMOS transistor coupled between the node 420 and the ground $V_{GND}$. The NMOS transistor has a gate coupled to the resetting voltage $V_R$ generated by the control logic 410. If the switch circuit 408 is an NMOS transistor, a noise is generated with a sound level less than that of the original popping noise when the control logic 410 switches off the switch circuit 408. Referring to FIG. 5, a cross-section view of an NMOS transistor 500 is shown. The NMOS transistor 500 has a gate on a substrate, and a source and a drain in the substrate. The gate, source, and drain are respectively coupled to the resetting signal $V_R$, the ground voltage $V_{GND}$, and the node 420. When the control logic 410 enables the resetting voltage $V_R$ to turn on the NMOS transistor 500, a charge amount Q is attracted by the gate voltage to form an inversion layer beneath the insulator. When the control logic 410 disables the resetting signal $V_R$, the inversion layer vanishes, and a charge amount of Q/2 flows to the drain and source of the NMOS transistor 500, inducing a temporary voltage change at the node 420 and producing a noise.

Assume that the NMOS transistor 500 has a width of 1 μm, a length of 0.35 μm, and the resetting voltage is 1.8V, then the sheet capacitance of the gate oxide is 5 fF/μm$^2$. The gate capacitance of the NMOS transistor 500 is therefore equal to (5 fF/μm$^2$×1 μm×0.35 μm)=1.75 fF, and the charge Q stored in the inversion layer is therefore equal to (1.75 fF×1.8V)=3.15 fC. The drain of the NMOS transistor 500 has capacitance of (5 pF+200 fF)=5.2 pF, and the temporary voltage change at the node 420 is therefore equal to (3.15 fC/5.2 pF)=0.6 mV. With the NMOS switch 500, the node 420 of the microphone circuit 400 has a temporary voltage change of 0.6 mV instead of a popping noise of 64 mV during a reset period. The temporary voltage change of 0.6 mV, however, still produces an audible sound with a 63 dB sound pressure level. Thus, two more embodiments of the switch circuit 408 are introduced to solve the problem.

Figure 6:
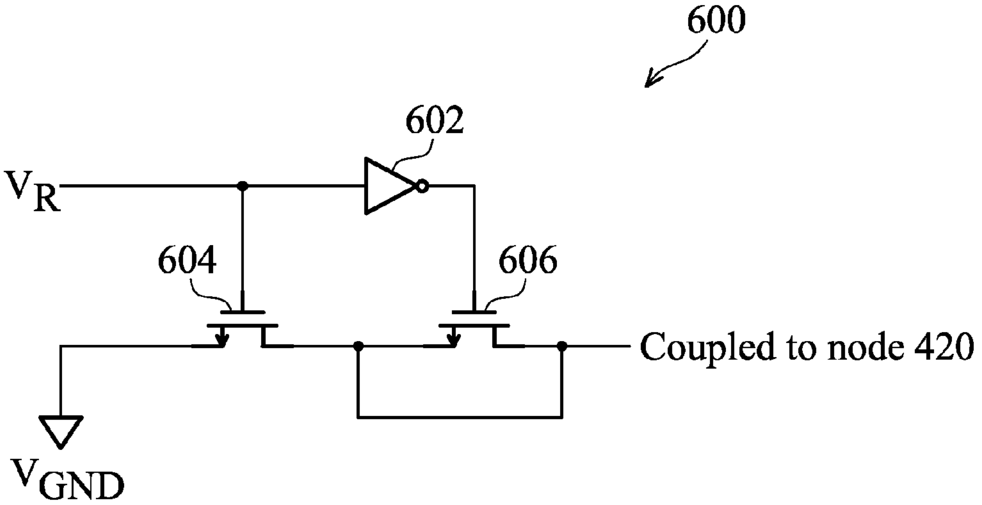
FIG. 6 is a block diagram of an embodiment of a switch circuit according to the invention.

Referring to FIG. 6, a block diagram of an embodiment of a switch circuit 600 according to the invention is shown. The switch circuit 600 comprises an inverter 602 and NMOS transistors 604 and 606, wherein a size of the NMOS transistor 606 is equal to a half of that of the NMOS transistor 604. When the control logic 410 enables the resetting signal $V_R$, the NMOS transistor 604 is turned on to couple the node 420 to the ground voltage $V_{GND}$, and the NMOS transistor 606 is turned off. When the control logic 410 disables the resetting signal $V_R$, the NMOS transistor 604 is turned off to decouple the node 420 from the ground voltage $V_{GND}$, and the NMOS transistor 606 is turned on. Charges originally stored in an inversion layer of the NMOS transistor 604 therefore flow from a drain of the NMOS transistor 604 to a source of the NMOS transistor 606 and are then absorbed by an inversion layer of the NMOS transistor 606, preventing the aforementioned problem of temporary voltage change of the node 420.

Figure 7:
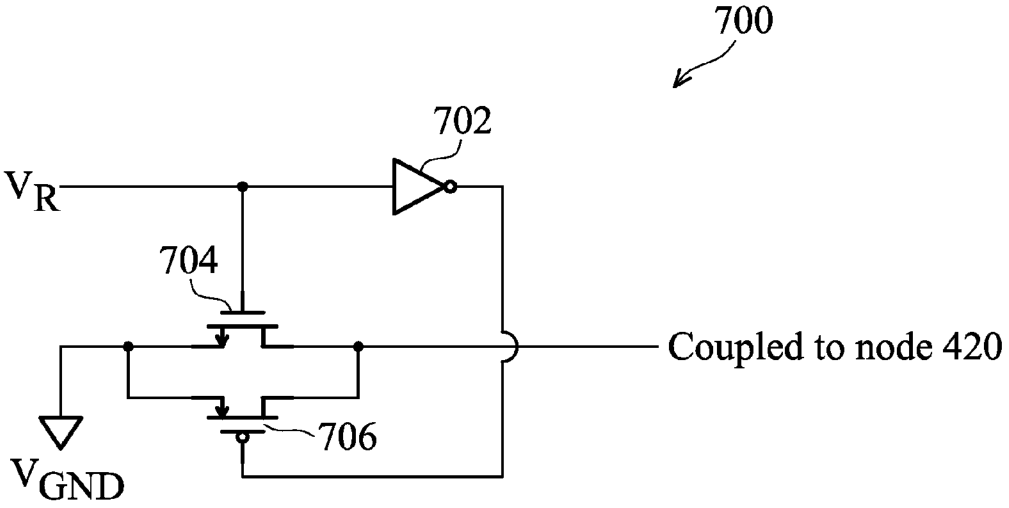
FIG. 7 is a block diagram of another embodiment of a switch circuit according to the invention.

Referring to FIG. 7, a block diagram of another embodiment of a switch circuit 700 according to the invention is shown. The switch circuit 700 comprises an inverter 702, an NMOS transistor 704, and a PMOS transistor 706, wherein a size of the NMOS transistor 704 is equal to that of the PMOS transistor 706. When the control logic 410 enables the resetting signal $V_R$, the NMOS transistor 704 is turned on to couple the node 420 to the ground voltage $V_{GND}$, and the PMOS transistor 706 is turned off. When the control logic 410 disables the resetting signal $V_R$, the NMOS transistor 704 is turned off to decouple the node 420 from the ground voltage $V_{GND}$, and the PMOS transistor 706 is turned on. Charges originally stored in an inversion layer of the NMOS transistor 704 therefore flow from a drain of the NMOS transistor 704 to a drain of the PMOS transistor 706 and are then absorbed by an inversion layer of the PMOS transistor 706, preventing the aforementioned problem of temporary voltage change of the node 420.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microphone circuit, comprising:

a transducer, coupled between a ground and a first node, converting a sound into a voltage signal output to the first node;

a biasing resistor, coupled between the ground and the first node;

a pre-amplifier, coupled between the first node and a second node, amplifying the voltage signal to obtain an output signal at the second node; and a switch circuit, coupled between the first node and the ground, coupling the first node to the ground to clamp a voltage of the first node to the ground to prevent generation of a popping noise when the microphone circuit is reset, and decoupling the first node from the ground after a voltage status of the microphone circuit is stable.

2. The microphone circuit as claimed in claim 1, wherein power of the pre-amplifier is supplied by a biasing voltage, the biasing voltage is applied to the pre-amplifier when the microphone circuit is reset, and the switch circuit couples the first node to the ground during a resetting period in which the biasing voltage is just applied to the pre-amplifier.

3. The microphone circuit as claimed in claim 1, wherein the microphone circuit further comprises a control logic, enabling a resetting signal to switch on the switch circuit, and disabling the resetting signal to switch off the switch circuit.

4. The microphone circuit as claimed in claim 3, wherein the control logic is power-on-reset circuit, detecting power level of a biasing voltage of the pre-amplifier and enabling the resetting signal when the power level is lower than a threshold.

5. The microphone circuit as claimed in claim 3, wherein the control logic is a clock detection circuit, detecting a frequency of a clock signal operating the microphone circuit and enabling the resetting signal when the frequency is lower than a threshold.

6. The microphone circuit as claimed in claim 1, wherein the switch circuit is a MOS transistor, coupled between the first node and the ground, having a gate coupled to a resetting signal directing whether the switch circuit is switched on.

7. The microphone circuit as claimed in claim 1, wherein the switch circuit comprises:

a first NMOS transistor, coupled between the ground and a third node, having a gate coupled to a resetting signal directing whether the switch circuit is switched on;

a second NMOS transistor, coupled between the first node and the third node, having a size equal to a half of that of the first NMOS transistor, wherein the third node is coupled to the first node; and an inverter, inverting the resetting signal to generate an inverse resetting signal at a gate of the second NMOS transistor.

8. The microphone circuit as claimed in claim 1, wherein the switch circuit comprises:

an NMOS transistor, coupled between the ground and the first node, having a gate coupled to a resetting signal directing whether the switch circuit is switched on;

a PMOS transistor, coupled between the ground and the first node, having a size equal to that of the NMOS transistor; and an inverter, inverting the resetting signal to generate an inverse resetting signal at a gate of the PMOS transistor.

9. The microphone circuit as claimed in claim 1, wherein the pre-amplifier comprises:

a load resistor, coupled between a biasing voltage and the second node;

an N-type JFET, coupled between the second node and the ground, having a gate coupled to the first node; and a capacitor, coupled between the second node and the first node.

10. The microphone circuit as claimed in claim 1, wherein the transducer is an electret condenser microphone (ECM).

11. A method for preventing a microphone circuit from generating a popping noise during resetting, comprising:

coupling a switch circuit between a first node and a ground, wherein a transducer of the microphone circuit converts a sound into a voltage signal output to the first node, and a pre-amplifier of the microphone circuit amplifies the voltage signal at the first node to obtain an output signal;

switching on the switch circuit to couple the first node to the ground to clamp a voltage of the first node to the ground to prevent generation of a popping noise during a resetting period in which a biasing voltage biasing the pre-amplifier is just applied to the pre-amplifier; and switching off the switch circuit to decouple the first node from the ground in an ordinary period other than the resetting period.

12. The method as claimed in claim 11, wherein the resetting period starts before the biasing voltage is applied to the pre-amplifier, and ends after a voltage status of the pre-amplifier is stable.

13. The method as claimed in claim 11, wherein the microphone circuit comprises:

the transducer, coupled between the ground and the first node;

a biasing resistor, coupling between the ground and the first node; and the pre-amplifier, coupled between the first node and a second node, generating the output signal at the second node.

14. The method as claimed in claim 11, wherein the method further comprises:

detecting power level of the biasing voltage;

enabling a resetting signal to switch on the switch circuit when the power level is lower than a threshold; and disabling the resetting signal to switch off the switch circuit when the power level is greater than the threshold.

15. The method as claimed in claim 11, wherein the method further comprises:

detecting a frequency of a clock signal operating the microphone circuit;

enabling a resetting signal to switch on the switch circuit when the frequency is lower than a threshold; and disabling the resetting signal to switch off the switch circuit when the frequency is greater than the threshold.

16. The method as claimed in claim 13, wherein the switch circuit is a MOS transistor, coupled between the first node and the ground, having a gate coupled to a resetting signal directing whether the switch circuit is switched on.

17. The method as claimed in claim 13, wherein the switch circuit comprises:

a first NMOS transistor, coupled between the ground and a third node, having a gate coupled to a resetting signal directing whether the switch circuit is switched on;

a second NMOS transistor, coupled between the first node and the third node, having a size equal to a half of that of the first NMOS transistor, wherein the third node is coupled to the first node; and an inverter, inverting the resetting signal to generate an inverse resetting signal at a gate of the second NMOS transistor.

18. The method as claimed in claim 13, wherein the switch circuit comprises:

an NMOS transistor, coupled between the ground and the first node, having a gate coupled to a resetting signal directing whether the switch circuit is switched on;

a PMOS transistor, coupled between the ground and the first node, having a size equal to that of the NMOS transistor; and an inverter, inverting the resetting signal to generate an inverse resetting signal at a gate of the PMOS transistor.

19. The method as claimed in claim 13, wherein the pre-amplifier comprises:

a load resistor, coupled between the biasing voltage and the second node;

an N-type JFET, coupled between the second node and the ground, having a gate coupled to the first node; and a capacitor, coupled between the second node and the first node.

20. The method as claimed in claim 11, wherein the transducer is an electret condenser microphone (ECM).

* * * * *